Patented June 1, 1954

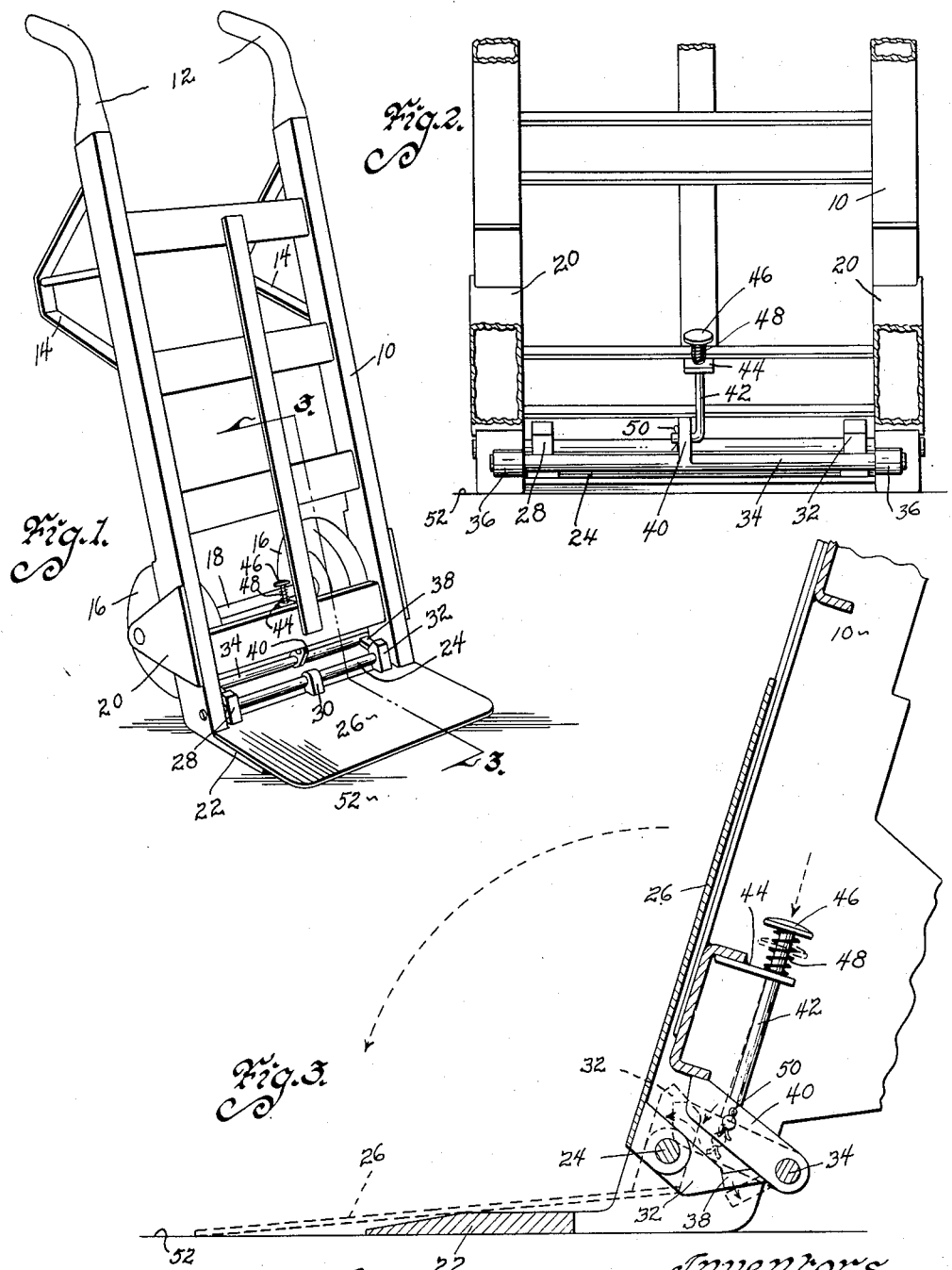

2,680,027

UNITED STATES PATENT OFFICE 2,680,027

LOCKING HINGED PLATFORM ON HAND TRUCK

Frank Allen De Puydt and Roger Clair Silver, Des Moines, Iowa

Application March 3, 1952, Serial No. 274,588

3 Claims. (Cl. 280—47.28)

Our invention relates to the well known two wheel hand truck or "dolly" that is used to lift trunks, boxes and other heavy objects and move them about. Specifically we have invented a hinged platform or drop nose for such a truck that makes a truck equipped with it very much more versatile than it otherwise would be.

The art of hand trucks is rather old. There is probably no living person who can remember a time when the two wheeled hand trucks with its curved handles and snub nose was not a common sight on substantially every railroad station platform. There have been numerous changes in the hand truck, but most of these have been far too subtle for the layman to grasp. Better materials have been employed, wheels are roller or ball bearing ones, and the devices now roll on rubber tires to cite a few categories of improvements. However, the usual truck looks rather like its predecessor of seventy-five years ago to the eye of the average man. There has been little basic change in the device. Of course special trucks have been developed for handling barrels and other oddly shaped articles, but generally the hand truck of today is the same as the one of times past.

These trucks are used by all sorts of business establishments from the previously mentioned railroad station down to the retail selling establishment that maintains a stock room from which the shelves in the store itself are replenished. They are used to move cartons of canned goods, bags of salt and sugar, flour sacks, crates of fresh foods in a grocery store. Hand trucks are used by transportation companies to load and unload all kinds of merchandise from their vehicles. The common hand truck has a short nose or plate that is slipped under a box, crate or truck that has been tipped slightly to permit this nose to be inserted. The truck with the item on it is tipped back until only the wheels of the truck are bearing the weight of the load. The operator balances the load on the truck and easily moves the material to its new location. One man using a truck can transport a weight that several men would struggle with if no truck were available. However, the standard truck is difficult to use with paper and even cloth sacks or bags. The short nose or platform usually places too much strain on a limited area of the bag or sack with the result that the bag is torn. This is perhaps not true if only a single unit is placed on the truck but common practice is to pile the bags up like cord wood and pick up six or eight at a time. As a matter of fact eight bags are easier to pick up than four or less because the weight of the load is more easily tipped back onto the wheels. As a portion of the load extends farther up the truck in its slightly tipped loading position it tends to counter-balance that portion of the load that is lower down and definitely in front of the wheels. When bags are carried with a snub nosed or standard truck, the first bag is usually positioned on edge and the following bags are then stacked on this first one. Even this expedient almost invariably tears the bottom bag, however, which means loss of merchandise.

There have been special hand trucks developed for the purpose of handling bags and sacks, because of the very problem outlined above. These bag trucks are identical to a standard one except that the nose is extended into a much longer platform which can support the weight of the bag without tearing it. Such trucks are also very useful and advantageous for purposes of handling short squat objects like electric motors and the like which tend to fall off the short nosed truck. At first glance it would appear that the broad nose truck is more versatile than the snub nose standard one. The broad platform truck has its disadvantages, however, in that it cannot be stored in as limited an area. Also and more important it is a time waster when used on the type of loads for which the standard truck is most useful. With a crate or box that is easily lifted with a standard truck, the process of getting it on the long nosed truck is wasted time. The box would have to be tipped farther to get the long nose under and could even require "walking" the box onto the truck before it is well placed. Furthermore a long nose truck would waste even more time when crates and the like are being unloaded. When the standard truck is used for carrying the type of freight for which it is best adapted, it is easily unloaded by merely tipping the truck forward by lifting the handles. When a long nosed truck is used for ordinary freight it is much more of a problem to get the truck unloaded. In fact, unloading takes more time even than loading. In our experience also there is more freight for which the short nosed standard truck is best adapted than there is material for which the long nose is necessary. Obviously the snub nosed truck can save time in many and perhaps most instances, and time is the one commodity which when gone is clearly not recoverable and for which there is no substitute. Also the long nosed truck is more hazardous to personnel. When the truck is empty and being trundled about, the long but relatively thin platform is not always easily seen even if brightly and distinctively painted. It is much easier for a leg to be damaged with the farther extending platform than with the short one. The short nose is all relatively close to the easily seen up-rights of the truck, and therefore, is more easily avoided. This is another serious disadvantage to the permanently long nosed truck which is particularly unfortunate in these days of a pinched labor market.

In large warehouses and depots or in highly specialized places where the goods handled are almost exclusively one kind, the problem is minimized and perhaps not at all serious. In the smaller warehouses and the like, however, there is a need for a truck that is highly efficient for both types of work. A small house cannot afford to have two complete sets of trucks, yet there are times when a complete set of one kind of truck is needed for one kind of article. One day a carload or two of paper bagged material is due. The earlier material must be moved to make room for the later. Obviously under these circumstances the maximum number of hand trucks is needed alternately for two entirely different kinds of work. Obviously a warehouse that has all of any one type of truck or part one type and part another will be more or less handicapped for part of the handling job outlined immediately above. We have solved all of these problems of the hand truck art with our present invention.

In view of the foregoing, therefore, it is the principal object of our invention to provide a locking hinged platform on a hand truck that adapts the truck to efficient operation with various types of merchandise.

It is a further object of our invention to provide a locking hinged platform on a hand truck that avoids wasted time when using the truck.

It is a further object of our invention to provide a locking hinged platform on a hand truck that makes the truck so equipped less hazardous to personnel.

It is a further object of our invention to provide a lock-hinged platform on hand trucks that is operated while the operator constantly retains his grip on the handles of the truck.

It is a further object of our invention to provide a locking hinged platform on a hand truck that is economical to manufacture and durable in use.

These and other objects will be apparent to those skilled in the art.

Our invention consists in the construction, arrangement, and combination of the various parts of the device, whereby the objects contemplated are attained as hereinafter more fully set forth, and specifically pointed out in our claims, and illustrated in the accompanying drawings, in which:

Fig. 1 is a perspective view of a hand truck equipped with our hinged drop nose platform and lock.

Fig. 2 is an enlarged fragmentary rear view of a hand truck equipped with my hinged platform and lock mechanism.

Fig. 3 is an enlarged fragmentary sectional view of a hand truck equipped with our hinged platform and lock mechanism and taken on the line 3—3 of Fig. 1 except that the drop nose platform is in the raised position. Broken lines show the drop nose in the lowered position.

Referring to the drawings we have designated the hand truck frame generally with the numeral 10. Curved handles 12 are secured to the upper end of each side rail as is the usual custom. A pair of standards designated 14 are mounted near the handles at each side to support the truck frame in a level horizontal position which is advantageous sometimes. The wheels 16 are appropriately journalled on an axle 18 the ends of which are supported by the brackets 20. Brackets 20 are rigidly secured to the frame 10. The bottom of the frame has the short platform nose 22 rigidly secured to or formed integrally therewith. It extends from the frame at a slightly obtuse angle from the front. The structure recited so far is not considered new or inventive by us, and we designate these parts by number merely to make it easier to discuss the use of the truck. We shall now describe the novel portion of the truck shown in the illustrations and which is our invention.

A rod 24 is journalled in the lower end of frame 10 and above the toe 22. Hingedly secured to this rod is the broad platform or drop nose 26; the bearing blocks 28, 30 and 32 respectively serving as the connecting means. Block 30 is rounded on top as appears clearly in Fig. 1. Blocks 28 and 32, however, are slanted in two directions on the top as may be seen readily in Fig. 3. The purpose of this formation of the two outside blocks will be made clear in the discussion hereafter. A second rod 34 is pivotally supported at the lower rear of frame 10 by the bearings 36 which are identical and, therefore, designated with a single numeral. Near each bearing block is a rigidly secured boss block or stud designated 38. At a convenient intermediate point on shaft 34 is the lever arm 40. A bent shaft 42 is slidably mounted in bearing plate 44 that is rigidly secured to a cross member of frame 10. Knob 46 caps shaft 42 and also provides a surface against which spring 48 may apply an upward pressure to shaft 42 from its point of bearing or reference on plate 44. The bent end of shaft 42 extends through a suitable hole in lever arm 40 and is secured against accidental displacement by cotter key 50 or some other suitable means. As is shown clearly in Fig. 3, the same cross member of frame 10 to which the plate 44 is secured also serves as a stop for shaft 42 by engaging the upper outer end of lever arm 40.

The operation of our device is as follows. In general the drop nose platform 26 is stored in the vertical position shown in Fig. 3. The nose may be so raised from the dropped position shown in Fig. 1 by merely tipping the truck back until the standards 14 approach the surface 52 on which the cart is shown as supported in all the figures. If this action is made with a sharp movement that is suddenly halted, the handles need not be lowered far, as the inertia of the drop nose platform will carry it up into the vertical position. As the bearing blocks 28 and 32 engage the boss blocks 38, the latter yield downwardly as shown by the broken lines in Fig. 3. When the end of the bearing blocks passes the bosses 38, however, spring 48 pulls the boss blocks back up to engage the short slanted portion of the tops of bearing blocks 28 and 32. Lever arm 40 engages the cross member and holds the boss blocks in a position to positively limit upward motion of bearing blocks 28 and 32. The nose is securely locked in the up position and in effect an ordinary snub nose hand truck is provided. When the truck is needed for bags, sacks or short squatty equipment such as an engine cylinder block or the like, a mere tap of the foot on knob 46 depresses it by overcoming the tension of spring 48 and thereby rotating shaft 34 by depressing lever arm 40. The boss blocks are similarly moved from the solid line position in Fig. 3 to that shown with broken lines. The lock mechanism does not inhibit the movement of the drop nose under these conditions, and a suddenly halted forward movement of handles 12 causes platform 26 to swing down into position ready to receive bags or the like. Because snub nose 22 engages platform 26, the latter need not be as strong as would otherwise be necessary. It is clear from the foregoing description that our drop nose hand truck with the lock mechanism is a perfect solution for the problem presented above. The ease of altering the position of platform 26 makes it convenient and practical to always transport the empty truck with only the stub nose extending. Hence accidents are much less apt to happen with our truck than with the usual fixed long nose truck. Also of course no time will be lost when using our lock equipped drop nose truck as a result of the long platform 26 accidentally falling forward when the truck is being used to handle materials for which the short nose is more appropriate. It should be obvious also that our mechanism is so simple as to be substantially fool-proof and require no maintenance to speak of.

Some changes may be made in the construction and arrangement of our locking hinged platform on hand truck without departing from the real spirit and purpose of our invention, and it is our intention to cover by our claims, any modified forms of structure or use of mechanical equivalents which may be reasonably included within their scope.

We claim:

1. In a hand truck of the type having a short nose and frame for engaging and supporting merchandise, a pair of shafts pivotally secured to said frame near said short nose, a drop nose hingedly secured to one of said shafts, members rigidly secured to said drop nose and extending beyond said one of said shafts and toward the other of said shafts when said drop nose is raised and lying adjacent to said frame, boss blocks rigidly secured to said other shaft and extending to the ends of said members that are rigidly secured to said drop nose, a lever arm rigidly secured to said other shaft, a rigid shaft slidably mounted on said frame and pivotally secured to said lever arm, resilient means bearing on said frame and said rigid shaft yieldingly urging said rigid shaft in one direction, and a stop means secured to said frame and engaging said lever arm to positively limit movement of said lever arm as a result of the action of said resilient means at a point that positions said boss blocks in engagement with the ends of said members rigidly secured to said drop nose.

2. In a hand truck of the type having a short nose and frame for engaging and supporting merchandise, a pair of shafts pivotally secured to said frame near said short nose, a drop nose hingedly secured to one of said shafts, members rigidly secured to said drop nose and extending beyond said one of said shafts and toward the other of said shafts when said drop nose is raised and lying adjacent to said frame, boss blocks rigidly secured to said other shaft and extending to the ends of said members that are rigidly secured to said drop nose, a lever arm rigidly secured to said other shaft and extending therefrom in the same direction as said boss blocks, a short rigid shaft slidably mounted on said frame and pivotally secured to said lever arm, and a spring bearing on said frame and said short rigid shaft yieldingly urging said short rigid shaft away from said rotatable shafts.

3. In a hand truck of the type having a short nose and frame for engaging and supporting merchandise, a pair of shafts pivotally secured to said frame near said short nose, a drop nose hingedly secured to one of said shafts, members rigidly secured to said drop nose and extending beyond said one of said shafts and toward the other of said shafts when said drop nose is raised and lying adjacent to said frame, boss blocks rigidly secured to said other shaft and extending to the ends of said members that are rigidly secured to said drop nose, a pierced bearing plate secured to said frame, a lever arm rigidly secured to said other shaft and extending therefrom in the same direction as said boss blocks, a short rigid shaft slidably mounted in said pierced bearing plate and pivotally secured to said lever arm, a knob secured to said short rigid shaft on the opposite side of said pierced bearing plate from said rotatable shafts, a coil spring embracing said short rigid shaft and disposed between said bearing plate and said knob, and a stop means secured to said frame for positively limiting movement of said lever arm toward said bearing plate.

References Cited in the file of this patent

UNITED STATES PATENTS

| Number | Name | Date |
|---|---|---|
| 497,444 | Duffie et al. | May 16, 1893 |
| 522,202 | Frenette | July 3, 1894 |
| 529,738 | Lepage | Nov. 27, 1894 |
| 635,037 | Buck | Oct. 17, 1899 |
| 817,779 | Hughes et al. | Apr. 17, 1906 |
| 1,185,383 | Dickson | May 30, 1916 |

FOREIGN PATENTS

| Number | Country | Date |
|---|---|---|
| 22,575 | Great Britain | Mar. 30, 1911 |
| 574,071 | Great Britain | Dec. 19, 1945 |